United States Patent Office 2,831,255
Patented Apr. 22, 1958

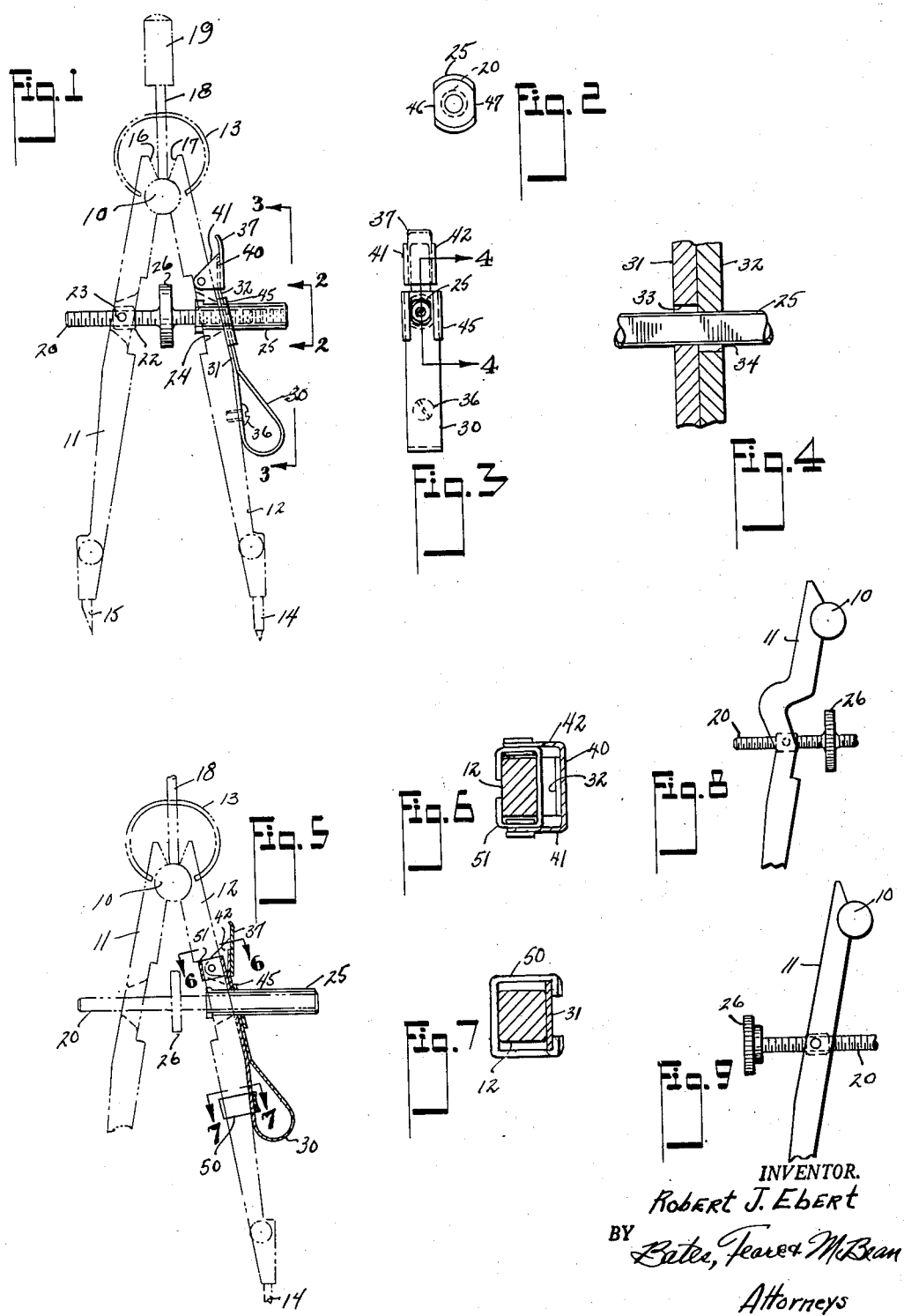

2,831,255

MULTIPLE SPEED COMPASS

Robert J. Ebert, Euclid, Ohio

Application March 9, 1954, Serial No. 415,019

5 Claims. (Cl. 33—154)

This invention relates generally to improvements in geometrical instruments and more particularly relates to an improved construction for a compass-type instrument having a selective multiple speed adjustment. The invention encompasses geometrical instruments of the type commonly referred to as bow compasses, whether employed as scribers, dividers or calipers, and all of which embody a pair of opposed distance contacts in the form of leg members pivotally joined together at one end with the distance between the free ends capable of adjustment by varying the angle defined at the pivoted end.

The usual bow compass includes a spacer rod which coacts between the legs, as for example through a threaded engagement therewith, to provide an incremental precision adjustment of the angle or distance between the legs. Although incremental precision type adjustment of the distance between the legs is a desirable control feature, the slow and tedious nature of such incremental adjustment detracts from optimum use when manipulative speed of the instrument is desired.

Accordingly, it is a principal object of this invention to provide a bow compass having a multiple speed adjustment of the spacing between opposed distance contacts.

Another object of this invention is the provision of an improved type of bow compass having both a precision and a non-precision quick acting type of adjustment which are independently operative in a selected manner throughout the operating range of the instrument.

Briefly, this invention contemplates a bow compass construction having a pair of opposed distance contacts pivotally connected at one end and having a spacer rod adjustably coacting between the contacts to vary the distance spacing between the contacts. The adjustable coaction of the spacer rod between the opposed distance contacts includes a connection providing an incremental precision type of adjustment and another normally inactive connection which may be selectively activated to provide an independent quick-acting non-precision type of adjustment. Activation of the non-precision adjustment is obtained by manual release of a spring lock attachment which may be itself be independently adjusted to vary the degree of locking coaction.

A still further object of this invention relates to the provision of an accessory in the form of an adjustable spring lock attachment which together with minor modification can convert a conventional single speed compass adjustment into a multiple speed type of compass adjustment.

In the drawings:

Fig. 1 illustrates a bow compass having the multiple speed adjustment of this invention;

Fig. 2 is a view taken along the lines 2—2 in Fig. 1 to illustrate the extremity of the spacer rod sleeve;

Fig. 3 is a view taken along the lines 3—3 in Fig. 1;

Fig. 4 is an enlarged partial section of a view taken along the lines 4—4 in Fig. 3;

Fig. 5 illustrates another embodiment of the invention utilizing a spring lock attachment;

Figs. 6 and 7 are sectional views respectively taken along the lines 6—6 and 7—7 in Fig. 5; and Figs. 8 and 9 illustrate modified compass leg constructions and their coaction with the spacer rod.

Referring now more particularly to the exemplary illustration of Fig. 1, there is shown in dotted lines a conventional spring loaded bow type of compass having a pair of opposed contact leg members 11 and 12 pivotally joined at one end 10 and biased in spreading relation to each other under the influence of a C spring 13 coacting between the pivoted ends of the leg members. It will be understood that the invention is equally applicable to the open, free acting type of compass without the spring loading. In the preferred form shown, the free end of one leg 12 carries a bearing point in the form of a centering pin 14, about which the compass may be employed to describe arcs or circles as traced by a pencil lead 15 carried at the free end of the other leg 11. The ends of the C-spring 13 are shown engaged in recesses in the pivoted leg extremities which are formed to present mutually engageable opposed edges 16 and 17 adapted to function as a stop to limit further outward movement when the edges are brought into engagement with each other. The pivot pin 10 also serves to anchor one end of a fixed rod 18 extending centrally through the C-spring and provided with a knurled head piece 19 by which the compass is held and directed in use.

In the absence of any retaining means, the spring loading of the C-spring would act continuously upon the pivoted leg members to spread them to their ultimate spread position relative to each other. Therefore, this type of compass usually includes a spacer rod 20 adjustably coacting between the legs to restrict the spreading tendency of the legs relative to each other. An incremental precision type of adjustment can be obtained by effecting such coaction through a threaded engagement between the spacer rod and at least one of the leg members. In the preferred form shown, the precision type of adjustment is obtained by mounting a threaded spacer rod 20 between the legs intermediate the pivoted and outer free ends thereof. One extremity of the spacer rod 20 is rotatably seated in bracket 22 which, in turn, is mounted on a pivot pin 23 carried by one of the leg members 11 for pivotal movement in the plane of the leg members. The other leg member 12 is provided with an intermediately located aperture 24 disposed for axial alignment with the spacer rod 20 along a transverse axis between the leg members. An elongated sleeve 25 is shown axially disposed in the leg aperture 24 and is provided with an internal thread for engagement with the adjacent threaded end of the spacer rod 20.

If the sleeve 25 were fixed against axial movement in the leg aperture 24, the bow compass would retain the incremental precision type adjustment which would operate in response to rotation of a knurled knob 26 fixed intermediate the ends of the spacer rod 20. However, in accordance with this invention, there is provided sufficient clearance between the leg aperture 24 and the sleeve 25 to permit the sleeve to slide axially through the aperture, the pivotal connection of the other end of the spacer rod 20 coacting to maintain axial alignment between the rod and the aperture as the distance spacing between the leg members is varied. Since the sleeve 25 is free to slide through the leg aperture 24, the leg members 11 and 12 are again free to spread to their ultimate spaced position relative to each other. Therefore, and further in accordance with this invention, there is provided an adjustable spring type of lock for normally restricting relative movement of the sleeve 25 in the leg aperture 24 until selectively released by manipulation of the locking device.

The locking device takes the form of a spring band loop 30 having its extremities 31 and 32 overlying each other in parallel planes for a portion of their length. Each band extremity 31 and 32 is provided with an aperture 33 and 34 respectively, both of which can be aligned by relative parallel movement of the respective band extremities. The apertures 33 and 34 each have a diameter sufficient to receive and pass the sleeve 25 therethrough when mounted on leg member in a manner to be hereinafter more fully described.

The desired releasable locking action is obtained by fixing one end of the band 31 with a stud 36 to the outer longitudinal surface of the leg member 12 with the aperture 33 in that end of the band aligned in fixed relation with the aperture 24 through the leg member. The other end 32 of the spring band loop 30 thus overlies the fixed end 31 and is preferably coupled to a bracket 40 having ears 41 and 42 pivotally connected to the leg member 12, whereby pressure on the pivoted bracket thumb lever 37 at the extremity 32 of the spring band loop 30 will move that end of the band relative to the other fixed end 31 and in parallel plane. The spring band loop 30 is so mounted on the leg member 12 that it is normally biased with the apertures 33 and 34 offset relative to each other as best shown in Fig. 4 of the drawings. Thus, relative movement of the manipulated end 32 of the band loop 30 can be controlled to align the apertures 34 with the fixedly aligned apertures 24 and 33 and permit the sleeve 25 to slide through.

By particular reference to the enlarged partial sectional view of Fig. 4 of the drawings, it will be seen that the normally biased offset relation of the apertures 33 and 34 in the ends of the band loop 30 will act in radially opposite directions from opposite sides of the sleeve 25 to clamp the sleeve in fixed relation therein and thereby to prevent any axial movement of the sleeve therethrough. Relative movement of the movable end 32 of the band loop 30 will align the apertures to release the clamping force on the sleeve 25 and free it for axial movement through the aligned apertures. Thus, the bow compass may be selectively converted from an incremental precision type of distance adjustment to a non-precision quick acting type of adjustment by simply manipulating a bracket thumb lever 37 to free a spring lock normally restricting relative movement between the sleeve 25 and one of the leg members 12.

As best shown in Figs. 1 and 3 of the drawings, the ends 31 and 32 of the band loop are preferably disposed in a guide bracket 45 having inturned edges to maintain the parallel relationship between the ends of the band loop. Also, as best shown in Fig. 2, the sleeve 25 is preferably provided with flatted sides 46 and 47 to prevent slippage or creepage of the sleeve through the locking apertures 33 and 34 of the spring band loop 30 when the knurled knob 26 is turned for precision distance adjustment. The apertures in the leg member and in the ends of the spring band loop 30 have a configuration similar to the sleeve cross-section for coaction with the sleeve to prevent the undesirable slippage.

Referring now to Figs. 5 through 7 of the drawings, there is illustrated an embodiment of the invention wherein the spring band loop 30 is in the form of an attachment that may be removably mounted on an existing single speed bow compass for multiple speed coaction with a simple modification of the compass involving providing an aperture through one of the compass legs with a slidable sleeve in the manner hereinbefore described. The mounting of the spring band loop attachment can be accomplished by means of suitable U-shaped band clip type brackets 50 and 51 as best shown in the sectional views of Figs. 6 and 7 of the drawings. In this embodiment, the lower band clip 50 would fix the end 31 of the band loop 30 to the leg member 12 and the upper band clip 51 which is shown as an integral part of the band loop, would secure the pivotal connection of the bracket 40 to the leg member 12. The degree of locking coaction provided by the spring band loop 30 may be varied by changing the size of the loop or by changing the leverage of the pivoted extremity thereby providing an adjustable spring lock which may be readily attached as an accessory to convert a single speed compass adjustment to an adjustable multiple speed compass adjustment.

Figs. 8 and 9 of the drawings illustrate modified leg configurations and their structural relationship to the spreader rod 20. The modified forms are designed to provide greater clearance between the knurled knob 26 and the inner longitudinal surface of the leg members to insure angular clearance at all times between the knurled periphery of the knob 26 and the shoulders on the inside longitudinal edge of the legs when the quick acting non-precision type of adjustment is effective.

Thus, there has been provided a multiple speed distance adjustment for a bow compass type of geometrical instrument having both a precision and a non-precision type of distance adjustment which may be selectively activated throughout the full operating range of the instrument. Fine precision adjustments are equally attainable in both the spreading and retracting directions and a quick acting non-precision type of adjustment to an infinite number of positions in either direction is selectively attainable throughout the operating range of the instrument. Each of the adjustments are independently operative through the medium of a positive, nonslip, releasible lock which may be adjusted to any degree of locking strength for permissive controlled positioning of opposed distance contacts relative to each other. The lock lever is conveniently positioned relative to the operative components of the lock and the compass to permit easy and efficient manipulation by one hand. The locking elements are constructed to prevent slippage and are designed and mounted in such a manner at to automatically compensate for the change in angularity between the opposed distance contacts of the instrument as the relative positions of the contacts are changed. The combination of quickly attained infinite spread adjustments with fine precision adjustments is the ultimate in drafting compass manipulative speed.

I have shown and described what I consider to be the preferred embodiment of my invention along with similar modified forms and it will be obvious to those skilled in the art that other changes and modifications may be made without departing from the scope of my invention as defined by the appended claims.

I claim:

1. An adjustable locking device adapted to be attached to one leg of a bow compass having a pair of legs pivoted at one end and having a spacer rod with one end slidably extending through an aperture in such one leg comprising, a spring band loop having its free ends overlying each other and each end having an aperture therethrough, a pair of band clips spaced apart along one end of the band loop and adapted to clip said one end in fixed position on said one compass leg with the corresponding band aperture aligned axially with the leg aperture, and means movably connecting the extremity of the other end of said band loop to one of said band clips with its aperture biased by the spring loop in radially offset relation to the aperture in said one end of the band loop, whereby the apertures in the ends of said band loop may be aligned axially by moving said other end of the band loop in a direction against the loop bias.

2. In a geometrical instrument having opposed distance contacts pivotally connected at one end for angular separation, a spacer rod having one end coupled to one contact and the other end slidably extending through an aligned aperture in the other contact and adapted to vary the distance therebetween in either direction by any one of an infinite number of selected distance increments within its operating range, manually releasable means including a spring-band loop having one end fixed on said other contact with the other end thereof having an aperture overlying the contact aperture, said other end of the spring-band loop having a movable connection to said other contact said loop continuously biasing its aperture in off-set relation with the contact aperture to clamp said other end of the spacer rod against relative axial movement throughout the operative range of angular separation, said band aperture adapted to be aligned with said contact aperture consequent upon selective movement of said other end of the band loop against the spring loop bias to permit said other end of the spacer rod to slide therethrough.

3. In a geometrical instrument having a pair of legs pivotally connected at one end for angular separation, a spacer rod having one end pivotally connected to one leg for movement in the plane of the legs, the other end of said rod having a smooth axial surface and the other leg having an axially aligned smooth-walled aperture for slidably receiving said other end of the spacer rod therethrough, means for restricting relative movement between said other leg and the rod including a spring-band loop having an inner end fixed on said other leg and overlying the aperture therethrough, an outer end of said band loop overlying said inner end and movably connected to said other leg for relative movement in a plane transverse to the aperture axis, each end of the band loop having an aperture for receiving the other extended end of the spacer rod therethrough, the apertures in each end of the band loop being normally off-set in a plane transverse to the spacer rod axis under the continuous influence of the spring bias to radially clamp the extended end of the spacer rod and restrict it against axial movement throughout the operative range of angular separation, and other means coacting between the ends of the band loop to position the outer movable end relative to the inner fixed end against the spring bias to align the band apertures and to release the radially acting restriction on the end of the spacer rod and thereby selectively free the leg for sliding movement in either direction along the rod.

4. In a geometrical instrument having opposed distance contacts pivotally connected at one end, a multiple speed distance adjustment comprising in combination, a threaded spacer rod having one end coupled to one contact, the other contact having a smooth-walled aperture positioned opposite the rod coupling on said one contact, an internally threaded sleeve having a smooth external axial surface slidably disposed in the contact aperture and adjustably receiving the other end of said spacer rod in threaded engagement therein, manually releasable means coacting between the sleeve and the contact to normally restrict relative axial movement of the sleeve through the contact aperture, said manually releasable means including a spring-band loop having one end fixed to said other contact with the other end having an aperture overlying the contact aperture, a movable connection between said other end of the band-loop and said other contact coacting therewith to bias the band aperture in offset relation to the contact aperture to clamp the sleeve therebetween against relative movement, and means for moving said other end of the band-loop in a direction against the bias to align the band aperture with the contact aperture to permit the sleeve to slide therethrough.

5. In a geometrical instrument having opposed distance contacts pivotally connected at one end and biased in spreading relation to each other the combination comprissing, an externally threaded rod having one end coupled to one distance contact and the other end extending toward the other distance contact, a sleeve having a smooth external axial surface and an internal thread for receiving and engaging said other end of the rod, said other distance contact having a smooth-walled aperture for slidably receiving said sleeve therethrough, a spring-band loop having one end fixed on said other contact and the other end having an aperture overlying the contact aperture to slidably receive the sleeve therethrough, and releasable means for maintaining said apertures in offset relation to each other including a movable connection between said other end of the band-loop and said other contact, said loop normally biasing the band aperture in offset relation to the contact aperture, and said connection adapted for selective movement in a direction opposed to the bias to align the apertures and to permit the sleeve to slide therethrough.

References Cited in the file of this patent
UNITED STATES PATENTS

| | | |
|---|---|---|
| 1,152,892 | Henry | Sept. 7, 1915 |
| 2,471,193 | Brower | May 24, 1949 |
| 2,472,022 | Neal | May 31, 1949 |
| 2,588,780 | Van Pappelendam | Mar. 11, 1952 |
| 2,637,113 | Kroenlein | May 5, 1953 |

FOREIGN PATENTS

| | | |
|---|---|---|
| 467,610 | Germany | Oct. 27, 1928 |